(12) United States Patent
Shah et al.

(10) Patent No.: US 11,494,156 B1
(45) Date of Patent: Nov. 8, 2022

(54) CABLE CONNECTION INFORMATION DISPLAY SYSTEM

(71) Applicant: Dell Products L.P., Round Rock, TX (US)

(72) Inventors: Maunish Shah, Austin, TX (US); Shree Rathinasamy, Round Rock, TX (US); Joseph LaSalle White, San Jose, CA (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/382,913

(22) Filed: Jul. 22, 2021

(51) Int. Cl.
*G06F 3/147* (2006.01)
*G06F 13/40* (2006.01)

(52) U.S. Cl.
CPC ............ *G06F 3/147* (2013.01); *G06F 13/409* (2013.01)

(58) Field of Classification Search
CPC ...... G06F 3/147; G06F 13/409; G06F 11/325; G06F 13/4068; G06F 3/1205; G06F 11/00; G06F 11/221; G06F 11/3006; G06F 11/3041; G06F 11/3048; G06F 11/3051; G06F 11/3055; G06F 11/324; G06F 2113/16; G06F 3/12; G06F 3/1204; G06F 3/1208; G06F 3/1243; G06F 3/125; G06F 3/1251; G06F 3/1253; G06F 3/1255; G06F 3/1256; G06F 3/1257; G06F 30/18; G01R 19/155; G08B 5/22; G09G 2330/02; G09G 2370/12; G09G 2380/04; G02B 6/3895; H01B 7/365; H01B 13/34; H01R 13/465; H01R 13/64; G09F 3/00; G09F 3/0295
See application file for complete search history.

(56) References Cited

U.S. PATENT DOCUMENTS

| | | | |
|---|---|---|---|
| 8,184,933 B1* | 5/2012 | Aybay | G02B 6/3895 385/100 |
| 2013/0271352 A1* | 10/2013 | Wu | G06F 3/1446 345/1.1 |
| 2015/0015403 A1* | 1/2015 | LeMaistre | G08B 5/22 340/654 |
| 2016/0378630 A1* | 12/2016 | Narayanan | G06F 11/3041 710/18 |
| 2021/0357160 A1* | 11/2021 | Ehara | G06F 30/18 |
| 2022/0102028 A1* | 3/2022 | Horvath | H01B 9/005 |

* cited by examiner

*Primary Examiner* — Koosha Sharifi-Tafreshi
(74) *Attorney, Agent, or Firm* — Joseph Mencher

(57) ABSTRACT

A cable connection information display system includes a cable having a first cable connector, and a first cable connection information display subsystem that is included on the cable adjacent the first cable connector. The first cable connection information display subsystem includes a first display device, and a first connection information receiving subsystem that is coupled to the first cable connector and the first display device. The first connection information receiving subsystem receives first connection information, which identifies at least a first computing device and a first port, via the first cable connector and from the first computing device that includes the first port that is connected to the first cable connector. The first connection information receiving subsystem then provides the first connection information for display on the first display device to identify the first computing device and the first port.

20 Claims, 11 Drawing Sheets

US 11,494,156 B1

CABLE CONNECTION INFORMATION DISPLAY SYSTEM

BACKGROUND

The present disclosure relates generally to information handling systems, and more particularly to displaying cable connection information for a cable connected to an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and other networking devices known in the art, are often connected to many other computing devices (e.g., server devices, other switch devices, storage systems, etc.) in a datacenter via cabling in order to provide for the transmission of data between those devices, and in large datacenters the number of cables can make it difficult to determine connectivity between devices. For example, any particular computing device may be coupled to the switch device via a cable that connects to ports on the switch device and that computing device, respectively, and the connectivity of the switch device and that computing device is conventionally tracked via the use of physical cable "tags" on each end of the cable (e.g., the cable tag adjacent the end of the cable that is connected to the computing device will identify the connection to the switch device, and the cable tag adjacent the end of the cable that is connected to the switch device will identify the connection to the computing device). Such cable tags are typically created using a label maker, and then attached to each end of the cable manually by a network administrator. As will be appreciated by one of skill in the art, inappropriate handling of the cable (e.g., during cable connection tracing) can cause the cable tag to detach from the cable, and any change in the connection of the cable (e.g., to a different networking device and/or computing device) requires the removal of the "old" cable tag and the creation of a "new" cable tag that accurately describes the connection. Such issues are exacerbated when a patch panel is used to connect the switch device and a computing device, as both the cable between the switch device and the patch panel, as well as the cable between the computing device and the patch panel, are subject to the issues discussed above.

Accordingly, it would be desirable to provide cable connection information display system that addresses the issues discussed above.

SUMMARY

According to one embodiment, an Information Handling System (IHS) includes a first chassis; a first port included on the first chassis; a first processing system that is included in the first chassis and that is coupled to the first port; and a memory system that is included in the chassis, that is coupled to the processing system, and that includes instructions that, when executed by the processing system, cause the processing system to provide a connection information provisioning engine; a first cable connector connected to the first port; a cable extending from the first cable connector; and a first cable connection information display subsystem that is included on the cable adjacent the first cable connector, wherein the first cable connection information display subsystem includes: a first display device; and a first connection information receiving subsystem that is coupled to the first cable connector and the first display device, wherein the first connection information receiving subsystem is configured to: receive, via the first cable connector and from connection information provisioning engine, first connection information that identifies at least the first chassis and the first port; and provide the first connection information for display on the first display device to identify the first chassis and the first port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
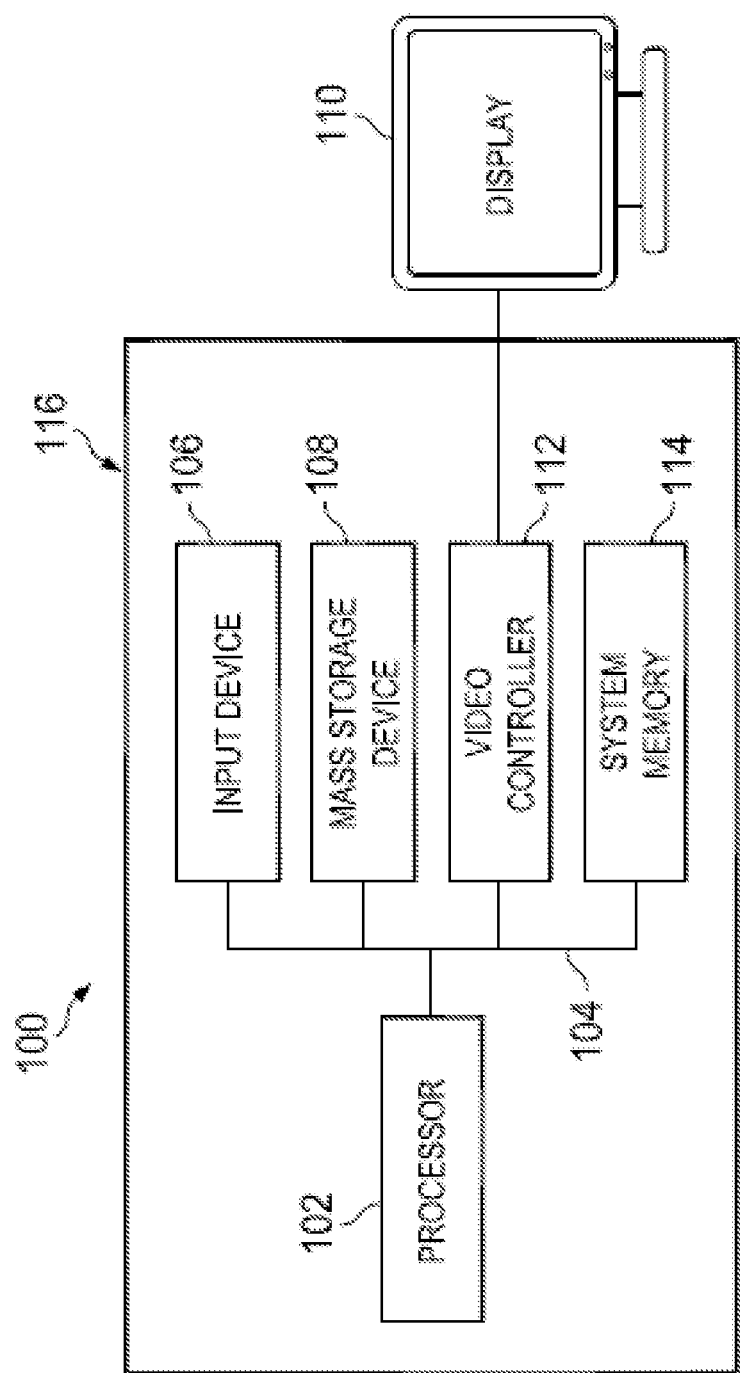
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
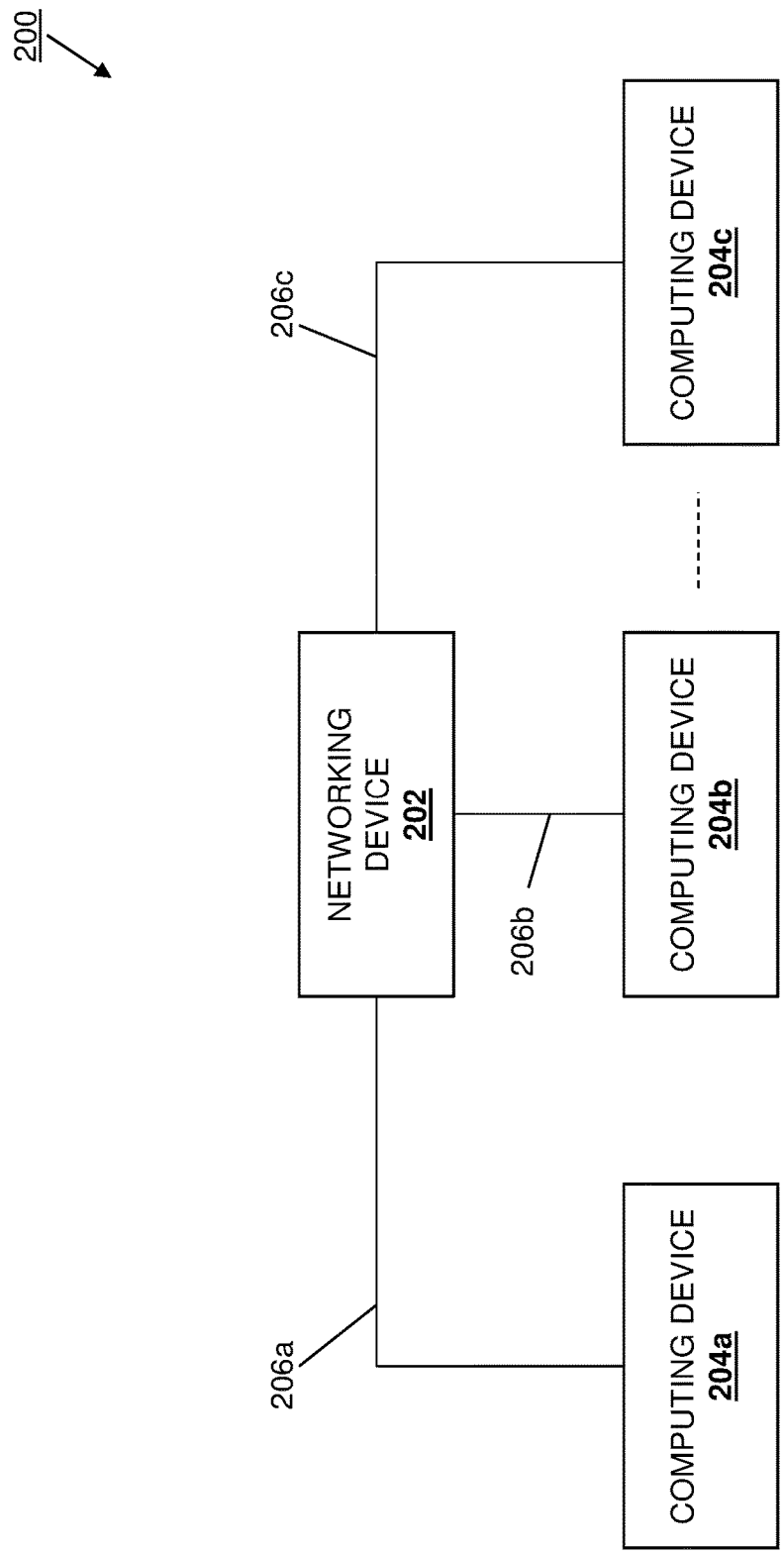
FIG. 2 is a schematic view illustrating an embodiment of a networked system.

Referring now to FIG. 2, an embodiment of a networked system 200 is illustrated. In the illustrated embodiment, the networked system 200 includes a networking device 202 coupled to a plurality of computing devices 204*a*, 204*b*, and up to 204*c* via respective cable systems 206*a*, 206*b*, and up to 206*c*. In an embodiment, any or all of the networking device 202 and the computing devices 204*a*-204*c* may be provided by the IHS 100 discussed above with reference to FIG. 1 and/or may include some or all of the components of the IHS 100, and in the specific examples below are described as being provided by a switch device and server devices. However, while illustrated and discussed as being provided by a switch device connected to server devices, one of skill in the art in possession of the present disclosure will recognize that any computing devices may be connected together in the networked system 200 using the cable connection information display system of the present disclosure while remaining within the scope of the present disclosure. As such, while a specific networked system 200 has been illustrated and described, one of skill in the art in possession of the present disclosure will recognize that the cable connection information display system of the present disclosure may utilized with a variety of components in a variety of component configurations while remaining within the scope of the present disclosure as well.

Figure 3:
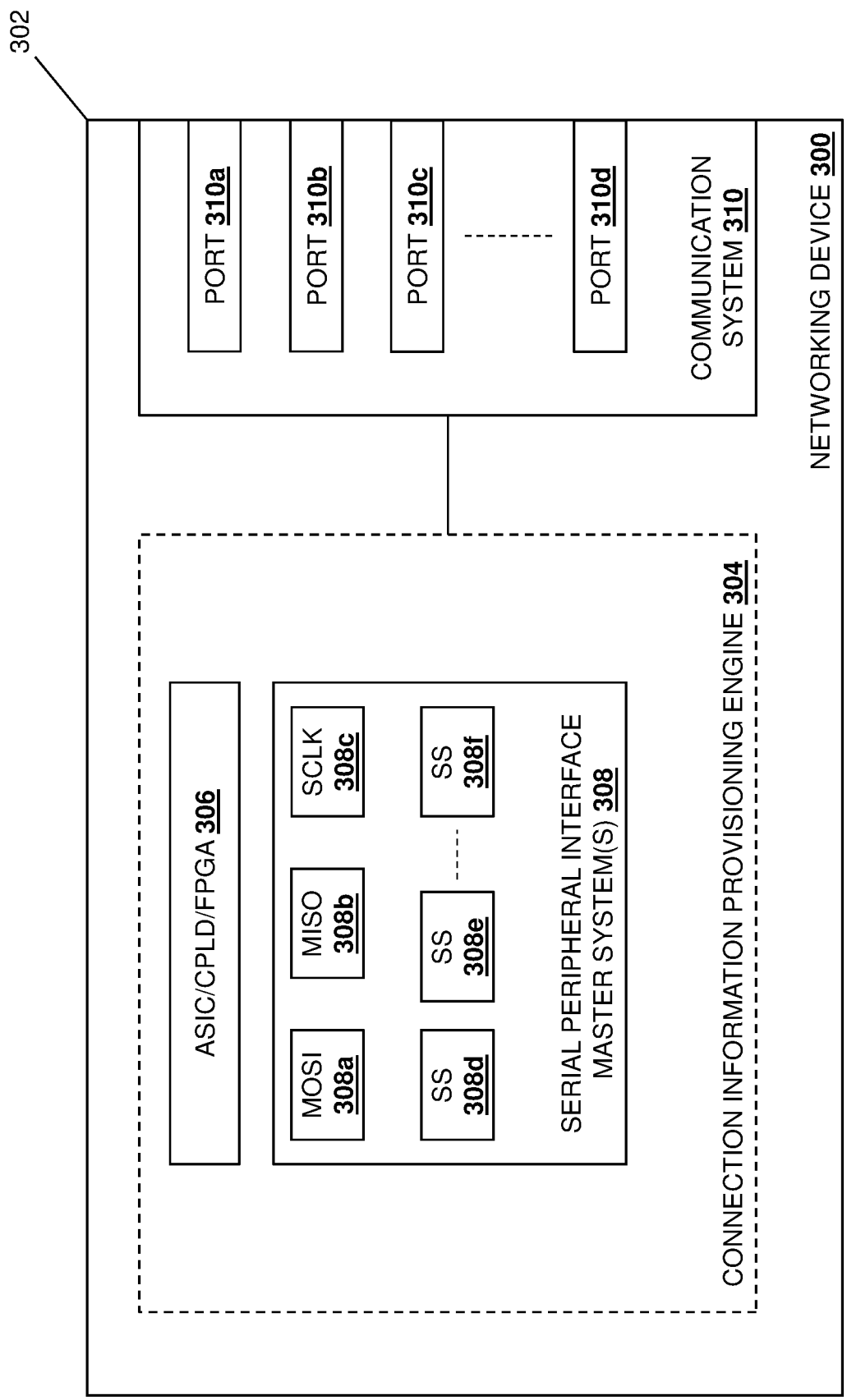
FIG. 3 is a schematic view illustrating an embodiment of a networking device that may be included in the networked system of FIG. 2.

Referring now to FIG. 3, an embodiment of a networking device 300 is illustrated that may provide the networking device 202 discussed above with reference to FIG. 2. As such, the networking device 300 may be provided by the IHS 100 discussed above with reference to FIG. 1 and/or may include some or all of the components of the IHS 100, and in specific examples below is described as being provided by a switch device. However, while illustrated and discussed as being provided by a switch device, one of skill in the art in possession of the present disclosure will recognize that the functionality of the networking device 300 discussed below may be provided by other computing devices that are configured to operate similarly as the networking device 300 discussed below. Furthermore, in some embodiments, any or all of the computing devices 204*a*-204*c* discussed above with reference to FIG. 2 may have components and/or functionality similar to the networking device 300 described below while remaining within the scope of the present disclosure.

In the illustrated embodiment, the networking device 300 includes a chassis 302 that houses the components of the networking device 300, only some of which are illustrated and discussed below. For example, the chassis 302 may house a processing system (e.g., which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a connection information provisioning engine 304 that is configured to perform the functionality of the connection information provisioning engines/subsystems and/or networking devices discussed below.

In the specific examples provided herein, the connection information provisioning engine 304 is illustrated and discussed as being provided by an Application Specific Integrated Circuit, Complex Programmable Logic Device, or Field Programmable Gate Array (ASIC/CPLD/FPGA) 306 (e.g., that provides a portion of the processing system and memory system discussed above), along with one or more Serial Peripheral Interface (SPI) master systems 308 (e.g., that provide a portion of the processing system and memory system discussed above) having a Master Out/Slave In (MOSI) element 308*a*, a Master In/Slave Out (MISO) element 308*b*, a Serial Clock (SCLK) 308*c* and a plurality of Slave Select (SS) elements 308*d*, 308*e*, and up to 308*f*. As discussed in further detail below, while some SPI master systems may not be limited in the number of SPI slave systems they support and will allow a single SPI master system in the networking device 300 to perform the connection information provisioning functionality discussed below, some SPI master systems may be limited to connecting to a maximum number of SPI slave systems (e.g., 4 SPI slave systems) and thus may require more than one SPI master system in the networking device 300 to support the connection information provisioning functionality discussed below for relatively larger numbers of cable systems. However, while particular components for providing a connection information provisioning engine 304 are illustrated and described, one of skill in the art in possession of the present disclosure will appreciate how the connection information provisioning engine 304 may be provided using a variety of other components while remaining within the scope of the present disclosure.

The chassis 302 may also house a communication system 310 that is coupled to the connection information provisioning engine 304 (e.g., via a coupling between the communication system 310 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. In the specific examples illustrated and discussed below, the communication system 310 includes a plurality of ports 310a, 310b, 310c, and up to 310d, any of which may be connected to the cable connectors on the cable systems discussed below. However, while a specific networking device 300 has been illustrated and described, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4A:
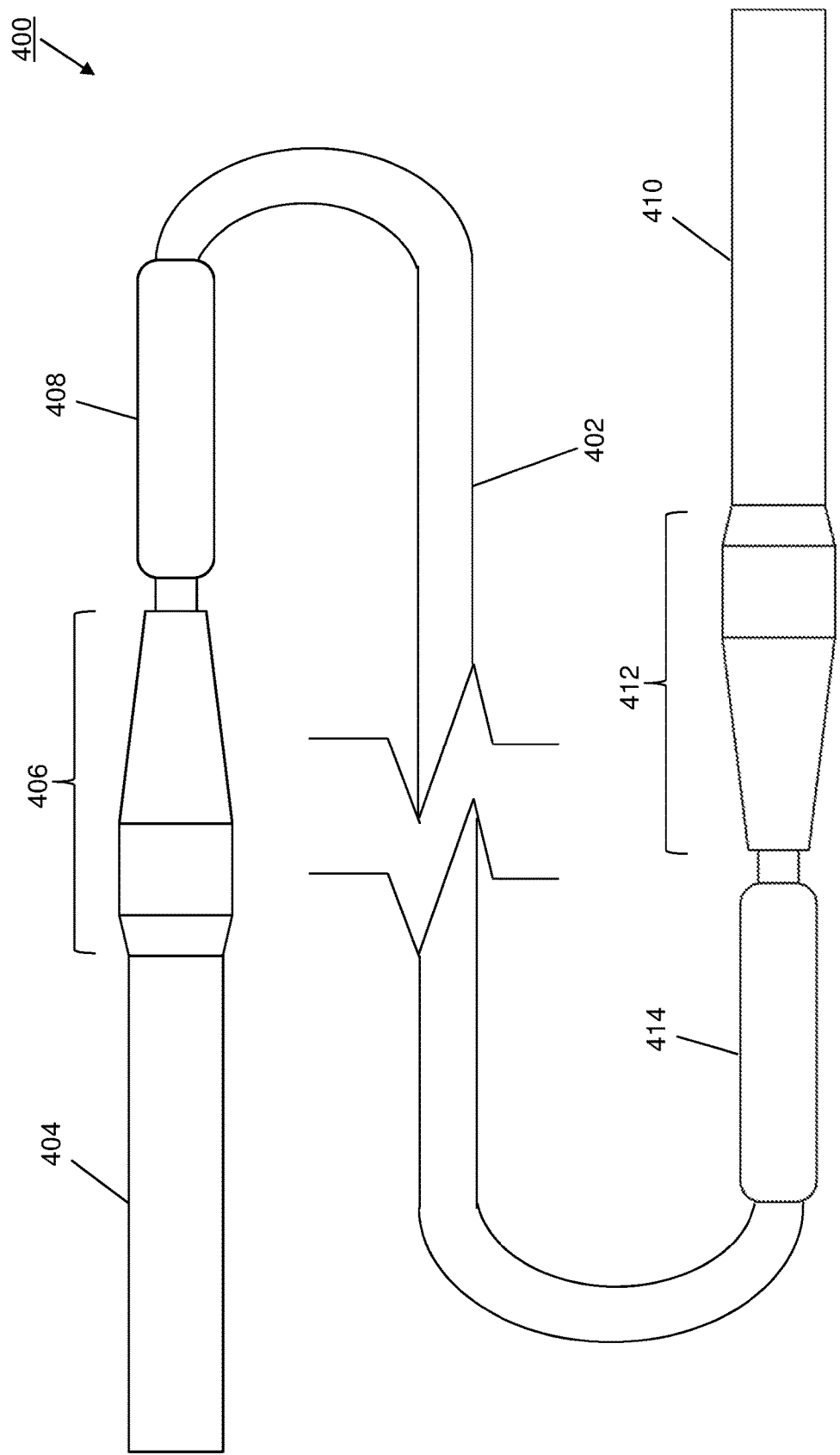
FIG. 4A is a schematic view illustrating an embodiment of a cable system that may be included in the networked system of FIG. 2.
Figure 4B:
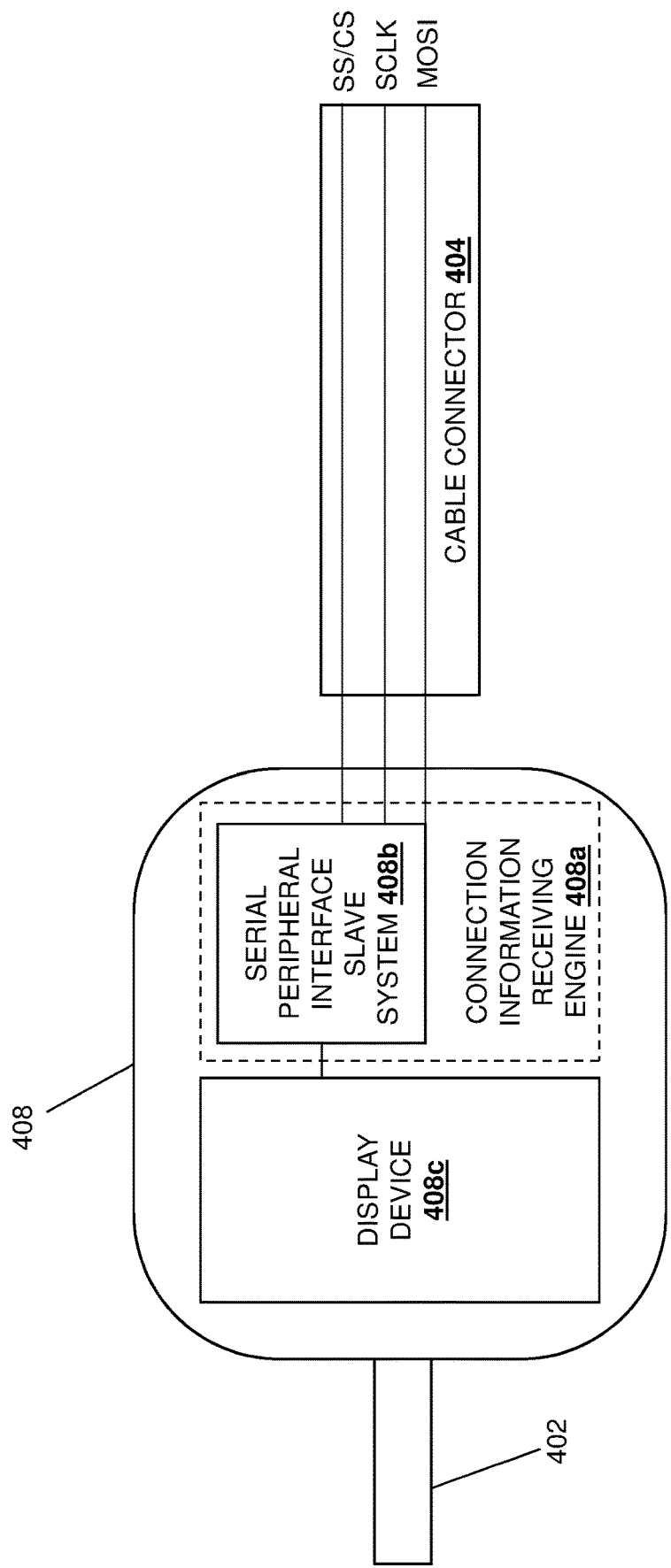
FIG. 4B is a schematic view illustrating an embodiment of the cable system of FIG. 4A.

Referring now to FIGS. 4A and 4B, an embodiment of cable system 400 is illustrated that may provide any of the cable systems 206a-206c discussed above with reference to FIG. 2. In the illustrated embodiment, the cable system 400 includes a cable 402a having a cable connector 404 included on a first end of the cable 402. A cable connector handle 406 is provided between the cable connector 404 and the cable 402, and a cable connection information display subsystem 408 is included on the cable 402 adjacent the cable connector 404. Similarly, a cable connector 410 is included on a second end of the cable 402 that is opposite the first end and the cable connector 404, with a cable connector handle 412 provided between the cable connector 410 and the cable 402, and a cable connection information display subsystem 414 included on the cable 402 adjacent the cable connector 410. However, while the cable connection information display subsystems 408 and 414 are illustrated as included on the cable 408, one of skill in the art in possession of the present disclosure will appreciate how the cable connection information display subsystems described herein may be provided on the cable connectors 404 and 410, the cable connector handles 406 and 412, and/or other location on the cable 402 while remaining within the scope of the present disclosure as well.

Furthermore, while one of skill in the art in possession of the present disclosure will recognize that the cable system 400 is illustrated and described herein as being provided by a Direct Attach Copper (DAC) cable system with a DAC cable having two DAC cable connectors on opposing ends, the cable connection information display systems may be provided on other types of cables while remaining within the scope of the present disclosure as well. For example, one of skill in the art in possession of the present disclosure will appreciate how Ethernet cable systems, fibre optic cable systems, and/or other types of cable systems will benefit from the cable connection information display system of the present disclosure. Furthermore, the cable connection information display functionality discussed below may also be provided on breakout cable systems (e.g., a cable system with a single cable connector on a first end of a cable, and multiple cable connectors on respective second ends of the cable), an example of which is described in further detail below.

With reference to FIG. 4B, a specific example of the cable connector 404 and cable connection information display subsystem 408 on the cable system 400 is illustrated, and one of skill in the art in possession of the present disclosure will appreciate how the cable connector 410 and the cable connection information display subsystem 414 on the cable system 400 may include similar components and functionality while remaining within the scope of the present disclosure. As illustrated in FIG. 4B, the connection information display subsystem 408 may include a processing system (e.g., not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a connection information receiving engine 408a that is configured to perform the functionality of the connection information receiving engines/subsystems and/or cable systems discussed below. In the specific examples illustrated and described below, the connection information receiving engine 408a is provided by a SRI slave system 408b, although one of skill in the art in possession of the present disclosure will appreciate how the connection information receiving engine 408a may be provided using other components while remaining within the scope of the present disclosure as well.

In the illustrated embodiment, the connection information display subsystem 408 also includes a display device 408c that is coupled to the connection information receiving engine 408a (e.g., via the SRI slave system 408b). In the specific examples provided below, the display device 408c is provided by a glass-free, flexible display device that is configured to "wrap" around the circumference of the cable 402, which one of skill in the art in possession of the present disclosure will recognize may be provided by a flexible active-matrix electrophoretic display (EPD) that is available in sizes (e.g., 1.38-2.1 inches) appropriate for cable circumferences and operates at relatively low temperatures that are suitable for application to the connection information display subsystems discussed below. However, one of skill in the art in possession of the present disclosure will appreciate how the display device 408c may be provided in a variety of other manners that will fall within the scope of the present disclosure as well. As illustrated in FIG. 4B, a Slave Select/Chip Select (SS/CS) line, a Serial Clock (SCLK) line, and a Master Out/Slave In (MOSI) line may extend through the cable connector 404 to the SRI slave system 408b that provides the connection information receiving engine 408a, and may allow the communications between the SRI slave system 408b in the connection information display subsystem 408 and the SRI master system(s) 308 that provides the connection information provisioning engine 304 in the networking device 300, discussed in further detail below.

Figure 5:
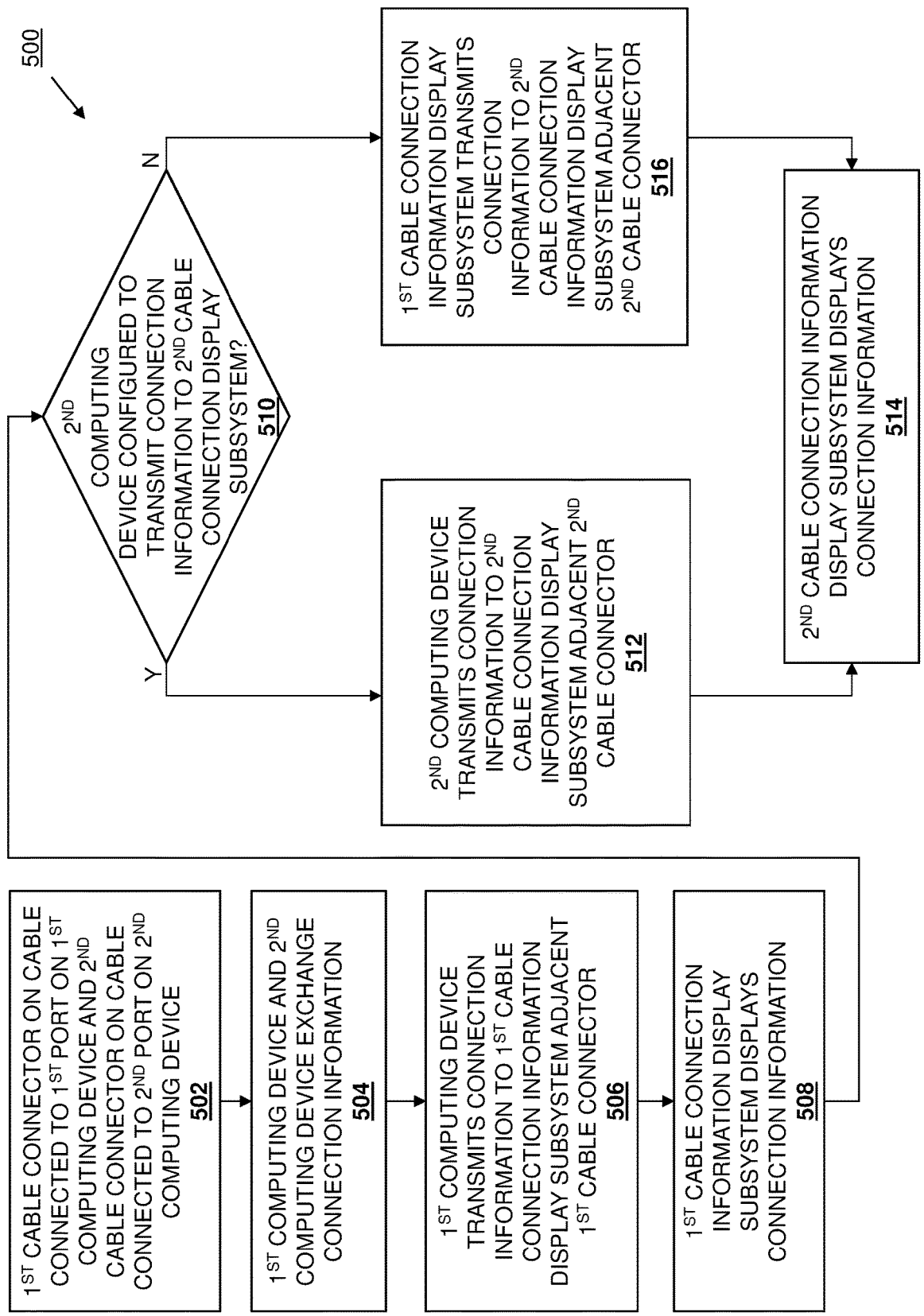
FIG. 5 is a flow chart illustrating an embodiment of a method for displaying cable connection information.

Referring now to FIG. 5, an embodiment of a method 500 for displaying cable connection information is illustrated. As discussed below, the systems and methods of the present disclosure provide a cable system with a cable connection information display subsystem that is located adjacent a cable connector on the cable and that is configured to display connection details about the cable connector (e.g., information associated with the port it is connected to, the computing device it is connected to, and/or any other connection information known in the art), which allows the details about the connection of a cable connector on a cable to be dynamically updated and displayed on that cable. For example, the cable connection information display system of the present disclosure may include a cable having a first cable connector, and a first cable connection information display subsystem that is included on the cable adjacent the first cable connector. The first cable connection information display subsystem includes a first display device, and a first connection information receiving subsystem that is coupled to the first cable connector and the first display device. The first connection information receiving subsystem receives first connection information, which identifies at least a first computing device and a first port, via the first cable connector and from the first computing device that includes the first port that is connected to the first cable connector. The first connection information receiving subsystem then provides the first connection information for display on the first display device to identify the first computing device and the first port. As such, the issues discussed above with conventional cable tagging are eliminated.

Figure 6A:
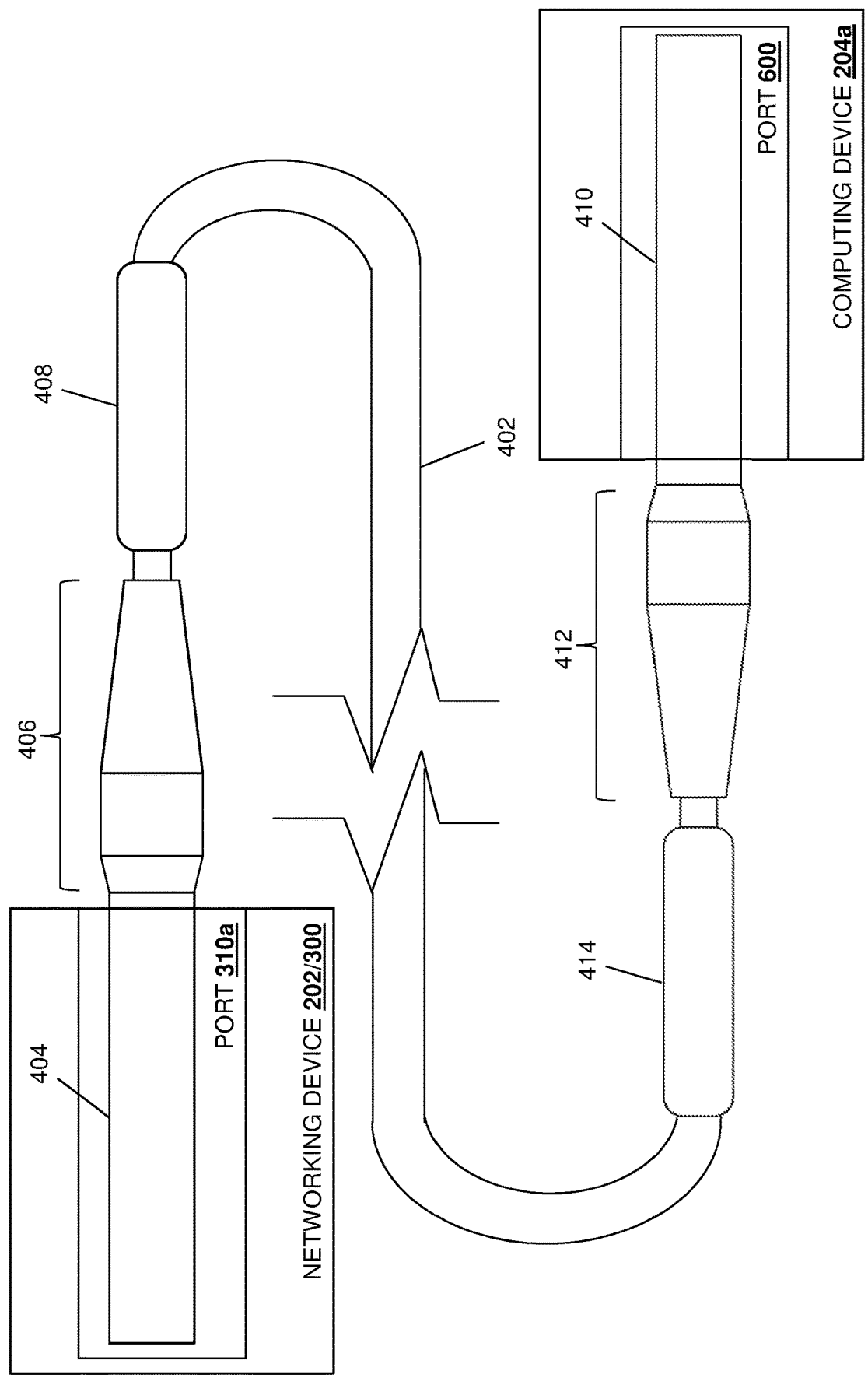
FIG. 6A is a schematic view illustrating an embodiment of the cable system of FIGS. 4A and 4B connecting a networking device and a computing device in the networked system of FIG. 2 during the method of FIG. 5.

The method 500 begins at block 502 where a first cable connector on cable is connected to a first port on a first computing device and a second cable connector on the cable is connected to a second port on a second computing device. With reference to FIG. 6A, in an embodiment of block 502, the cable connector 404 on the cable system 400 may be positioned adjacent the port 310a on the networking device 202/300, and then moved into the port 310a until it engages connector elements (not illustrated) in the port 310a such that it is communicatively connected to the connection information provisioning engine 304 via the communication system 310. Similarly, at block 502, the cable connector 410 on the cable system 400 may be positioned adjacent a port 600 on the computing device 204a, and then moved into the port 600 until it engages connector elements (not illustrated) in the port 600 such that it is communicatively connected to the computing device 204a. However, while the cable system 400 is illustrated and described as being used to provide the cable system 206a of FIG. 2 that connects the networking device 202/300 to the computing device 204a via the port 310a, one of skill in the art in possession of the present disclosure will appreciate that any of the ports 310a-310d on the networking device 202/300 may be connected to any of the computing devices 204a-204c to provide the functionality discussed below for any of the cable systems 206a-206c while remaining within the scope of the present disclosure as well.

Figure 6B:
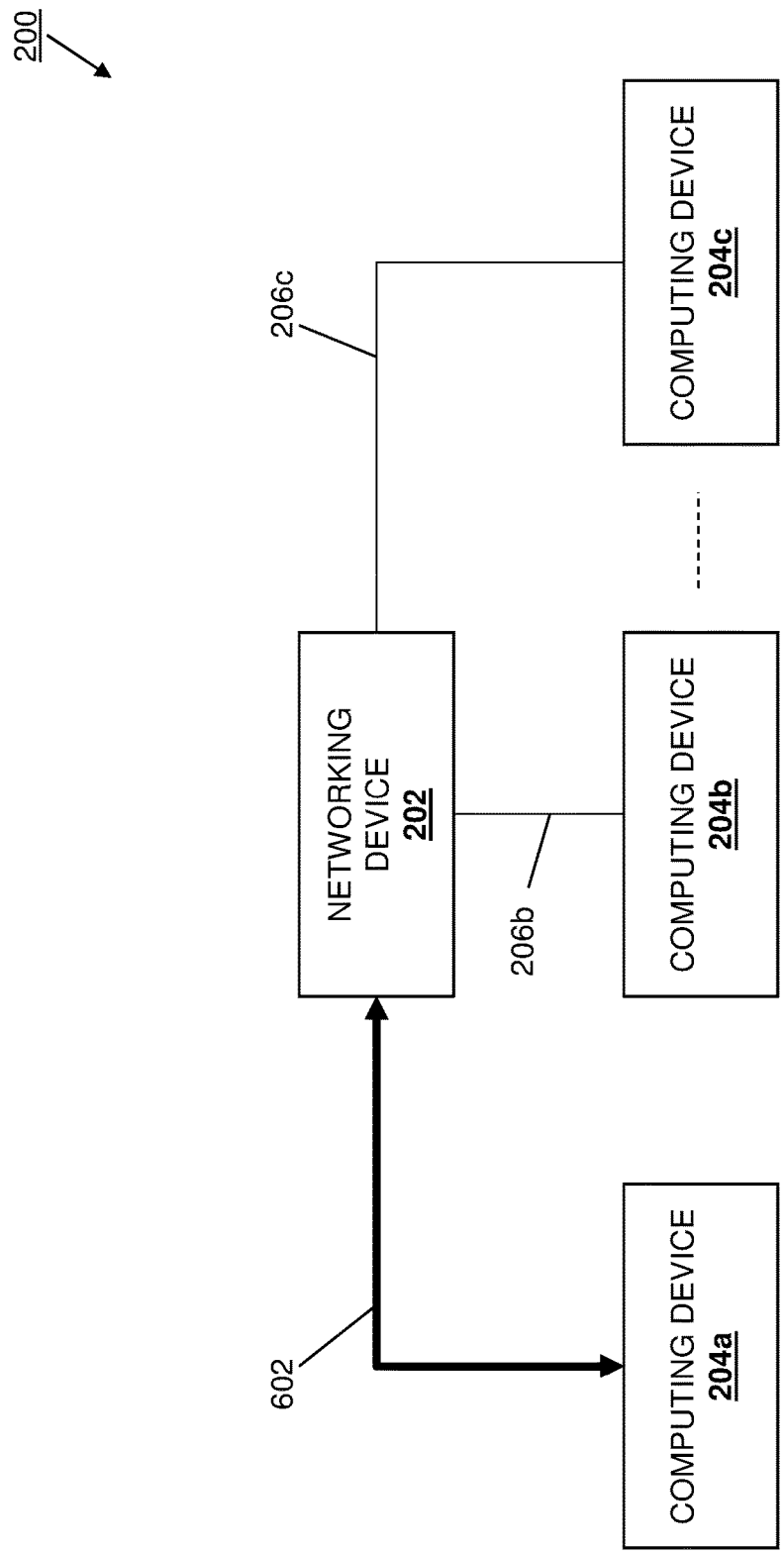
FIG. 6B is a schematic view illustrating an embodiment of the networking device and the computing device in the networked system of FIG. 2 communication during the method of FIG. 5.

The method 500 then proceeds to block 504 where the first computing device and the second computing device exchange connection information. With reference to FIG. 6B, in an embodiment of block 504, the networking device 202 and the computing device 204a may operate to perform connection information communication exchange operations 602 that that include the networking device 202 and the computing device 204a exchanging connection information communications between each other via the cable system 206a/400 connecting them. For example, at block 504 the connection information communication exchange operations 602 may include the exchange of Link Layer Discovery Protocol (LLDP) communications, Industry Standard Discovery Protocol (ISDP) communications, CISCO® Discovery Protocol (CDP) communications, and/or other dynamic connection information exchange techniques known in the art, which one of skill in the art in possession of the present disclosure will appreciate may allow the networking device 202 and the computing device 204a to exchange any of a variety of connection information about their connection with each other, and build and store respective tables that identify those connection details.

In an embodiment, the cable connection information exchanged between the networking device 202 and the computing device 204a may include cable connection information that is automatically discoverable by that device. For example, the networking device 202 may identify itself (e.g., via a device identifier, a rack location identifier (e.g., a U-location in a rack, etc.) and its port 310a to which the cable connector 404 is connected as part of the cable connection information transmitted to the computing device 204a, and the computing device 204a may identify itself (e.g., via a device identifier, a rack location identifier (e.g., a U-location in a rack, etc.) and its port 600 to which the cable connector 410 is connected as part of the cable connection information transmitted to the networking device 202. As such, the networking device 202 and/or computing device 204a may automatically discover cable connection information that will be displayed via the cable connection information display system of the present disclosure. In other embodiments, the cable connection information exchanged between the networking device 202 and the computing device 204a may include cable connection information that is manually provided to that device (e.g., by a network administrator or other use of the device).

For example, the networking device 202 may identify the building in which it is located, a rack in which it is located, and/or a position in the rack in which it is located (along with identifying itself and the port 310a to which the cable connector 404 is connected) as part of the cable connection information transmitted to the computing device 204a, and the computing device 204a may identify the building in which it is located, a rack in which it is located, and/or a position in the rack in which it is located (along with identifying itself and the port 600 to which the cable connector 410 is connected) as part of the cable connection information transmitted to the networking device 202. As such, a network administrator or other user may program any information (building, rack, rack location, etc.) in the networking device 202 and/or computing device 204a in order to customize what should be displayed via the cable connection information display system of the present disclosure. However, while two specific examples of cable connection information are described, one of skill in the art in possession of the present disclosure will appreciate that any of a variety of cable connection information may be exchanged at block 504 while remaining within the scope of the present disclosure as well.

The method 500 then proceeds to block 506 where the first computing device transmits connection information to a first cable connection information display subsystem adjacent the first cable connector. In an embodiment, at or before block 506, the connection information provisioning engine 304 (e.g., the ASIC/CPLD/FPGA 306 and the SRI master system(s) 308) in the networking device 202/300 may connect to the connection information receiving engine 408a (e.g., the SRI slave system 408b) in the cable connection information display subsystem 408, and one of skill in the art in possession of the present disclosure will appreciate how the connection information provisioning engine 304 (e.g., the ASIC/CPLD/FPGA 306 and the SRI master system(s) 308) in the networking device 202/300 may connect to multiple connection information receiving engines 408a (e.g., SRI slave systems 408b) in different cable connection information display subsystems 408 in different cable systems 400 connected to its ports 310a-310d using daisy-chain methods known in the art. As discussed above, some SRI master systems may not be limited in the number of SRI slave systems they support and will allow a single SRI master system in the networking device 300 to connect to connection information receiving engines 408a (e.g., SPI slave systems 408b) in any number of cable connection information display subsystems 408 connected to its ports, while some SPI master systems may be limited to connecting to a maximum number of SPI slave systems (e.g., 4 SPI slave systems) and thus may require more than one SPI master system in the networking device 300 to connect to connection information receiving engines 408a (e.g., SPI slave systems 408b) in cable connection information display subsystems 408 connected to its ports.

As such, the SPI master system(s) 308 in the networking device 202/300 may be compatible with SPI standards that allow the ASIC/CPLD/FPGA 306 to control the SPI slave system(s) 408b in the cable connection information display subsystem(s) 408 directly via the SPI master system(s) 308. As will be appreciated by one of skill in the art in possession of the present disclosure, any connection between the SPI master system(s) 308 in the networking device 202/300 and an SPI slave system 408b in a cable connection information display subsystem 408 may support full-duplex operations, but the embodiments described below may only utilize half-duplex operations to allow the SPI master system(s) 308 to transmit cable connection information to the cable connection information display subsystem 408 (via the MOSI element 308a). However, one of skill in the art in possession of the present disclosure will appreciate how the full-duplex functionality discussed above may be utilized in other embodiments while remaining within the scope of the present disclosure as well.

As such, in an embodiment of block 506, the connection information provisioning engine 304 (e.g., the ASIC/CPLD/FPGA 306 and the SPI master system(s) 308) in the networking device 202/300 may transmit at least some of the cable connection information it generated (i.e., for transmission to the computing device 204a) and at least some of the cable connection information it received from the computing device 204a to the connection information receiving engine 408a (e.g., the SPI slave system 408b) in the cable connection information display subsystem 408 that is included on the cable 402 adjacent the cable connector 404. For example, the ASIC/CPLD/FPGA 306 may utilize the MOSI element 308a, the SLCK element 308c, and/or the SS element 308d for the SPI slave system 408b in the cable connection information display subsystem 408 on the cable system 400 connected to the port 310a to transmit the cable connection information and an instruction to display the cable connection information via the MOSI line, SCLK line and/or the SS/CS line in the cable system 400 to the SPI slave system 408b in the cable connection information display subsystem 408.

As such, continuing with the specific examples provided above, the connection information provisioning engine 304 (e.g., the ASIC/CPLD/FPGA 306 and the SPI master system(s) 308) in the networking device 202/300 may transmit a port identifier for the port 310a to which the cable connector 404 is connected, a device identifier for the networking device 202/300 that includes that port 310a, a rack identifier for a rack in which the networking device 202/300 is located, and/or a building identifier for a building in which that rack that includes the networking device 202/300 is located, a port identifier for the port 600 to which the cable connector 410 is connected, a device identifier for the computing device 204a that includes that port 600, a rack identifier for a rack in which the computing device 204a is located, and/or a building identifier for a building in which that rack that includes the computing device 204a is located, along with an instruction to display those identifiers, to the connection information receiving engine 408a (e.g., the SPI slave system 408b) in the cable connection information display subsystem 408 that is included on the cable 402 adjacent the cable connector 404.

Figure 7:
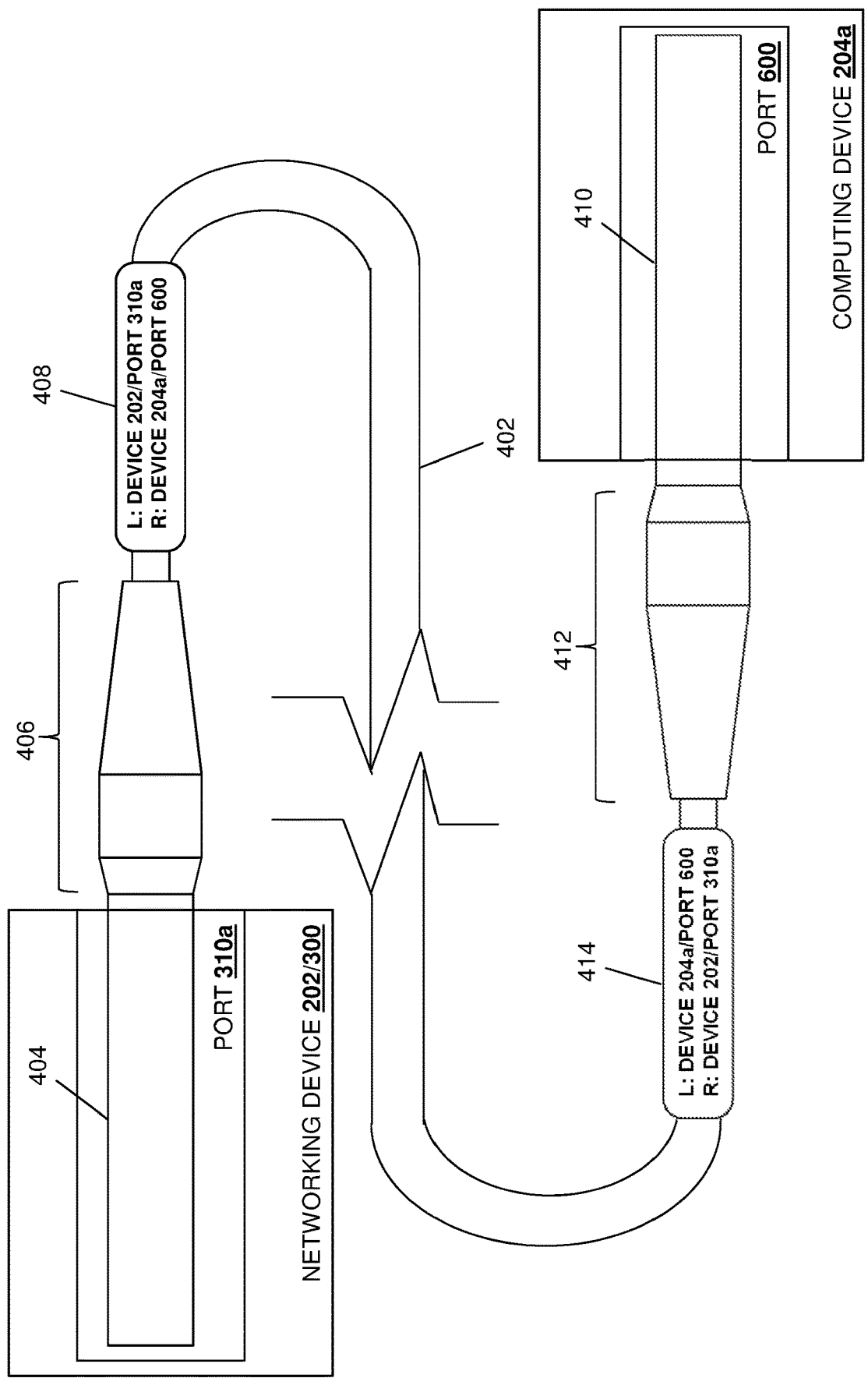
FIG. 7 is a schematic view illustrating an embodiment of the cable system of FIG. 6A operating during the method of FIG. 5.

The method 500 then proceeds to block 508 where the first cable connection information display subsystem displays the connection information. With reference to FIG. 7, in an embodiment of block 508 and in response to receiving the port identifier for the port 310a to which the cable connector 404 is connected, the device identifier for the networking device 202/300 that includes that port 310a, the port identifier for the port 600 to which the cable connector 410 is connected, and the device identifier for the computing device 204a that includes that port 600, along with the instruction to display those identifiers, the SPI slave system 408b in the cable connection information display subsystem 408 will operate to display that information on the display device 408c on the cable connection information display subsystem 408 (e.g., "L: DEVICE 202/PORT 310a" designating that the cable connector 404 is connected locally to the networking device 202 via port 310, and "R: DEVICE 204a/PORT 600" designating that the cable 402/cable connector 404 is connected remotely to the computing device 204a via port 600).

Figure 8A:
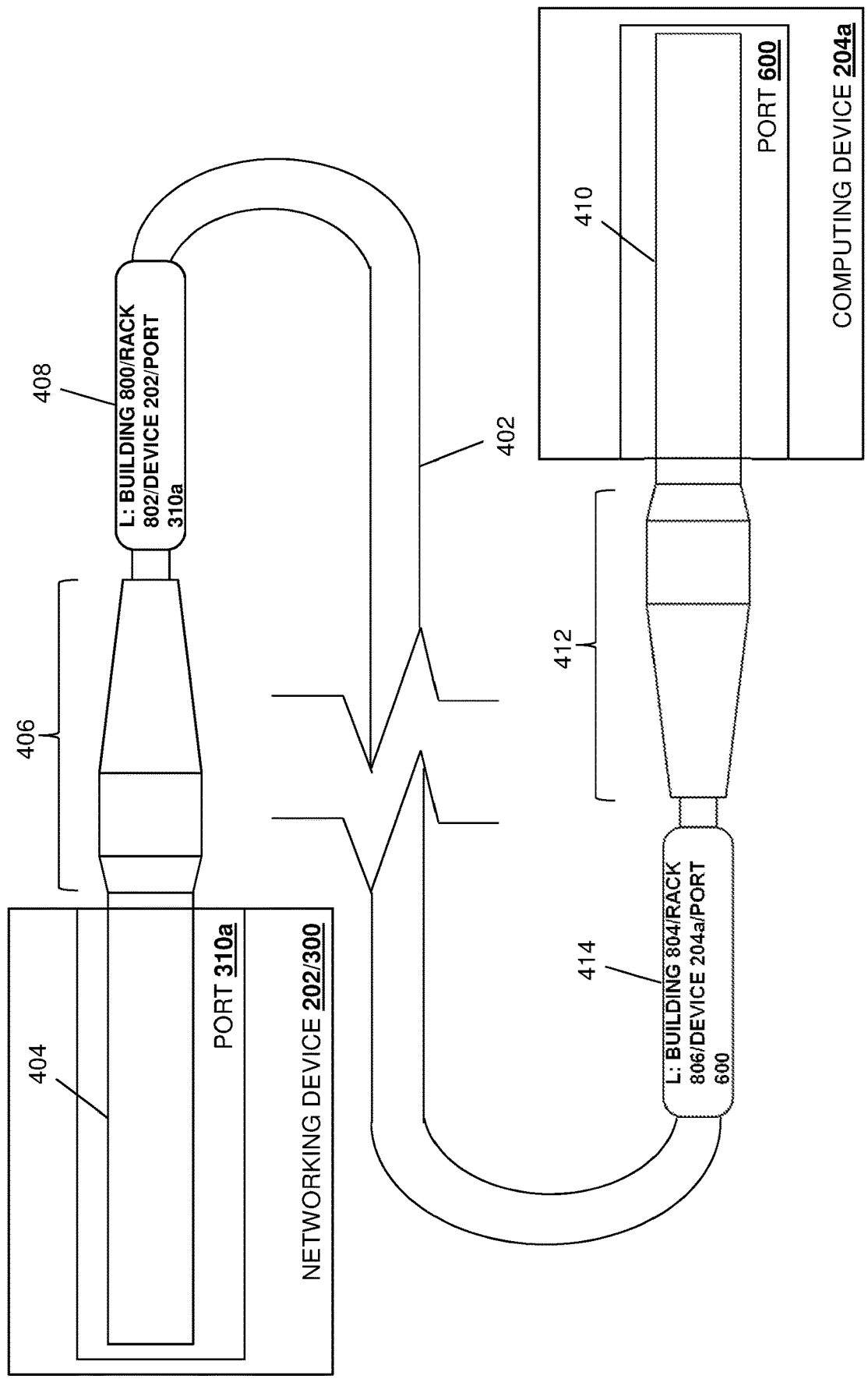
FIG. 8A is a schematic view illustrating an embodiment of the cable system of FIG. 6A operating during the method of FIG. 5.
Figure 8B:
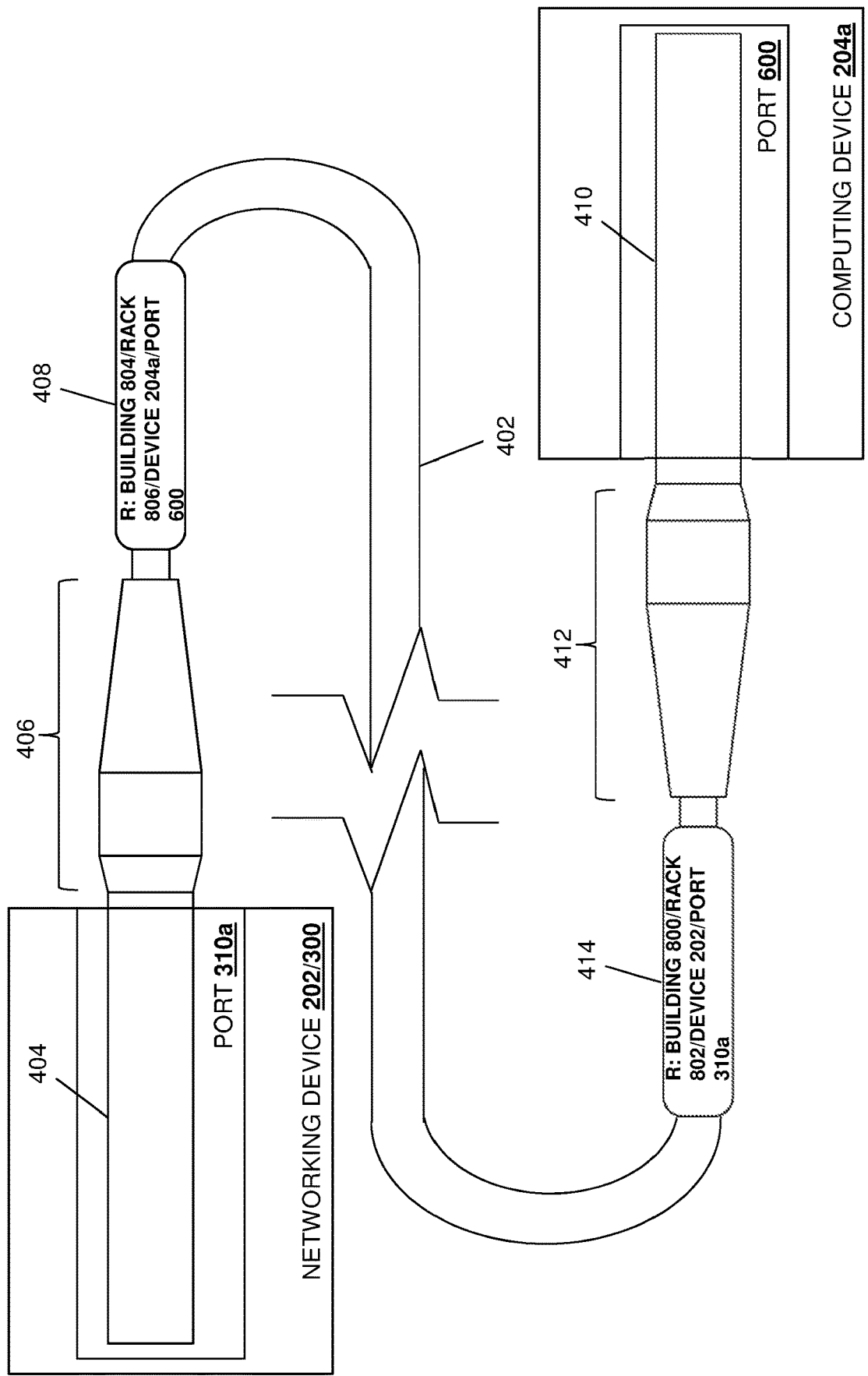
FIG. 8B is a schematic view illustrating an embodiment of the cable system of FIG. 6A operating during the method of FIG. 5.

With reference to FIGS. 8A and 8B, in an embodiment of block 508 and in response to receiving the port identifier for the port 310a to which the cable connector 404 is connected, the device identifier for the networking device 202/300 that includes that port 310a, the rack identifier for the rack that includes the networking device 202/300, the building identifier for the building that houses the rack that includes the networking device 202/300, the port identifier for the port 600 to which the cable connector 410 is connected, the device identifier for the computing device 204a that includes that port 600, the rack identifier for the rack that includes the computing device 204a, and the building identifier for the building that houses the rack that includes the computing device 204a, along with the instruction to display those identifiers, the SPI slave system 408b in the cable connection information display subsystem 408 will operate to display that information on the display device 408c on the cable connection information display subsystem 408 (e.g., "L: BUILDING 800/RACK 802/DEVICE 202/PORT 310a" illustrated in FIG. 8A designating that the cable connector 404 is connected locally to the networking device 202 via port 310 in rack 802 in building 800, and "R: BUILDING 804/RACK 806/DEVICE 204a/PORT 600" illustrated in FIG. 8B designating that the cable 402/cable connector 404 is connected remotely to the computing device 204a via port 600 in rack 806 in building 804). In different embodiments in which a relatively large amount of cable connection information is displayed on the display device 408c on the cable connection information display subsystem 408 (e.g., the building/rack/device/port identifiers in the example above), the local and remote cable connection information may be displayed on opposite sides of the cable connection information display subsystem 408 (e.g., enabled via the wrapping of the display device 408c around the cable 402), may be scrolled on the display device, may have portions displayed for limited and repeating time periods, and/or may be displayed using a variety of other techniques that would be apparent to one of skill in the art in possession of the present disclosure.

The method 500 then proceeds to decision block 510 where the method 500 proceeds depending on whether the second computing device is configured to transmit connection information to a second cable connection information display subsystem. As discussed below, the cable connection information display system of the present disclosure may be configured to display cable connection information adjacent both cable connectors on the cable system as long as one device to which that cable is connected is configured to provide that cable connection information to the cable system. As such, the method 500 may proceed in one manner at decision block 510 when the computing device 204a is configured to provide the cable connection information to the cable system 400 (in which case that functionality is leveraged as discussed below), or in another manner when the computing device 204a is not configured to provide the cable connection information to the cable system 400 (in which case that cable connection information received from the networking device 202 is shared by cable connection information display subsystem 408 via the cable 402 with the cable connection information display system 414).

If, at decision block 510, the second computing device is configured to transmit connection information to a second cable connection information display subsystem, the method 500 proceeds to block 512 where the second computing device transmits connection information to a second cable connection information display subsystem adjacent the second cable connector. In an embodiment, at or before block 512, a connection information provisioning engine (e.g., similar to the connection information provisioning information 304) in the computing device 204a may connect the connection information receiving engine (e.g., similar to the connection information receiving engine 408a) in the cable connection information display subsystem 414. As such, SRI master system(s) in the computing device 204a may be compatible with SRI standards that allow an ASIC/CPLD/FPGA to control the SRI slave system(s) 408b in the cable connection information display subsystem 414 directly.

As such, in an embodiment of block 512, the connection information provisioning engine in the computing device 204a may transmit at least some of the cable connection information it generated (i.e., for transmission to the networking device 202/300) and at least some of the cable connection information it received from the networking device 202/300 to the connection information receiving engine 408a (e.g., the SRI slave system 408b) in the cable connection information display subsystem 414 that is included on the cable 402 adjacent the cable connector 410. For example, an ASIC/CPLD/FPGA in the computing device 204a may utilize a MOSI element, a SLCK element, and an SS element for the SRI slave system 408b in the cable connection information display subsystem 414 connected to the port 600 to transmit the cable connection information and an instruction to display the cable connection information via a MOSI line, SCLK line and SS/CS line in the cable system 400 to the SRI slave system 408b in the cable connection information display subsystem 414.

As such, continuing with the specific examples provided above, the connection information provisioning engine 304 (e.g., the ASIC/CPLD/FPGA and the SRI master system(s)) in the computing device 204a may transmit a port identifier for the port 310a to which the cable connector 404 is connected, a device identifier for the networking device 202/300 that includes that port 310a, a rack identifier for a rack in which the networking device 202/300 is located, a building identifier for a building in which that rack that includes the networking device 202/300 is located, a port identifier for the port 600 to which the cable connector 410 is connected, a device identifier for the computing device 204a that includes that port 600, a rack identifier for a rack in which the computing device 204a is located, and/or a building identifier for a building in which that rack that includes the computing device 204a is located, along with an instruction to display those identifiers, to the connection information receiving engine 408a (e.g., the SPI slave system 408b) in the cable connection information display subsystem 414 that is included on the cable 402 adjacent the cable connector 410.

The method 500 then proceeds to block 514 where the second cable connection information display subsystem displays the connection information. With reference to FIG. 7, in an embodiment of block 514 and in response to receiving the port identifier for the port 310a to which the cable connector 404 is connected, the device identifier for the networking device 202/300 that includes that port 310a, the port identifier for the port 600 to which the cable connector 410 is connected, and the device identifier for the computing device 204a that includes that port 600, along with the instruction to display those identifiers, the SPI slave system 408b in the cable connection information display subsystem 414 will operate to display that information on the display device 408c on the cable connection information display subsystem 414 (e.g., "L: DEVICE 204a/PORT 600" designating that the cable connector 410 is connected locally to the computing device 204a via port 600, and "R: DEVICE 202/PORT 310a" designating that the cable 402/cable connector 410 is connected remotely to the networking device 202 via port 310).

With reference to FIGS. 8A and 8B, in an embodiment of block 514 and in response to receiving the port identifier for the port 310a to which the cable connector 404 is connected, the device identifier for the networking device 202/300 that includes that port 310a, the rack identifier for the rack that includes the networking device 202/300, the building identifier for the building that houses the rack that includes the networking device 202/300, the port identifier for the port 600 to which the cable connector 410 is connected, the device identifier for the computing device 204a that includes that port 600, the rack identifier for the rack that includes the computing device 204a, and the building identifier for the building that houses the rack that includes the computing device 204a, along with the instruction to display those identifiers, the SPI slave system 408b in the cable connection information display subsystem 414 will operate to display that information on the display device 408c on the cable connection information display subsystem 414 (e.g., "L: BUILDING 804/RACK 806/DEVICE 204a/PORT 600" illustrated in FIG. 8A designating that the cable connector 410 is connected locally to the computing device 204a via port 600 in rack 806 in building 804, and "R: BUILDING 800/RACK 802/DEVICE 202/PORT 310a" illustrated in FIG. 8B designating that the cable 402/cable connector 410 is connected remotely to the networking device 202 via port 310 in rack 802 in building 800). In different embodiments in which a relatively large amount of cable connection information is displayed on the display device 408c on the cable connection information display subsystem 414 (e.g., the building/rack/device/port identifiers in the example above), the local and remote cable connection information may be displayed on opposite sides of the cable connection information display subsystem 414 (e.g., enabled via the wrapping of the display device 408c around the cable 402), may be scrolled on the display device, may have portions displayed for limited and repeating time periods, and/or may be displayed using a variety of other techniques that would be apparent to one of skill in the art in possession of the present disclosure.

If, at decision block 510, the second computing device is not configured to transmit connection information to a second cable connection information display subsystem, the method 500 proceeds to block 516 where the first cable connection information display subsystem transmits connection information to a second cable connection information display subsystem adjacent the second cable connector. In an embodiment, at block 516 and in the event the computing device 204a is not configured to transmit cable connection information to the cable connection information display subsystem 414, the connection information receiving engine 408a (e.g., in the SRI slave system 408b) in the cable connection information display subsystem 408 may transmit the cable connection information that it received from the networking device 202/300 at block 506 to the connection information receiving engine 408a (e.g., in the SRI slave system 408b) in the cable connection information display subsystem 414, and the inventors of the present disclosure are currently developing techniques to allow the SRI slave systems in the cable connection information display subsystem 408 and 414 to transmit the cable connection information via the cable 402 and between each other. The method 500 then proceeds to block 514 where the second cable connection information display subsystem displays the connection information in substantially the same manner as discussed above with reference to block 514.

While not illustrated or described in detail above, one of skill in the art in possession of the present disclosure will appreciate how the cable connection information display subsystems described above may be provided adjacent each cable connector on a breakout cable, which one of skill in the art in possession of the present disclosure will appreciate may include a first cable connector on a first end of a cable, and may "break out" into multiple second cable connectors on respective second ends of that cable. In such embodiments, the display device included on the cable connection information display subsystem adjacent the first cable connector may operate to scroll or update over time in order to display the remote connection information for each of the multiple second cable connectors included on the breakout cable.

Thus, systems and methods have been described that provide a cable system with a cable connection information display subsystem that is located adjacent a cable connector on the cable and that is configured to display connection details about the cable connector (e.g., information associated with the port it is connected to, the computing device it is connected to, and/or any other connection information known in the art), which allows the details about the connection of a cable connector on a cable to be dynamically updated and displayed on that cable. For example, the cable connection information display system of the present disclosure may include a cable having a first cable connector, and a first cable connection information display subsystem that is included on the cable adjacent the first cable connector. The first cable connection information display subsystem includes a first display device, and a first connection information receiving subsystem that is coupled to the first cable connector and the first display device. The first connection information receiving subsystem receives first connection information, which identifies at least a first computing device and a first port, via the first cable connector and from the first computing device that includes the first port that is connected to the first cable connector. The first connection information receiving subsystem then provides the first connection information for display on the first display device to identify the first computing device and the first port. As such, the issues discussed above with conventional cable tagging are eliminated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable connection information display system, comprising:
   a cable including a first cable connector; and
   a first cable connection information display subsystem that is included on the cable adjacent the first cable connector, wherein the first cable connection information display subsystem includes:
      a first display device; and
      a first Serial Peripheral Interface (SPI) system that is coupled to the first cable connector and the first display device, wherein the first SPI slave system is configured to:
         receive, via the first cable connector and from a first SPI master system in a first computing device that includes a first port that is connected to the first cable connector, first connection information that identifies at least the first computing device and the first port; and
         provide the first connection information for display on the first display device to identify the first computing device and the first port.

2. The system of claim 1, wherein the first connection information also identifies at least one of: a building in which the first computing device is located and a rack in which the first computing device is located, and wherein the first SPI slave system is configured to provide the first connection information for display on the first display device to identify the at least one of: the building in which the first computing device is located and the rack in which the first computing device is located.

3. The system of claim 1, wherein the first display device is a flexible display device that is wrapped around a portion of the cable.

4. The system of claim 1, wherein the first SPI slave system is configured to receive the first connection information from the first SPI master system in the first computing device via at least one of a Master Out/Slave In (MOSI) coupling, a Serial Clock (SCLK) coupling, or an Slave Select/Chip Select (SS/CS) coupling provided by the first cable connector.

5. The system of claim 1, wherein the cable is a Direct Attach Copper (DAC) cable, and wherein the first cable connector is a DAC cable connector.

6. The system of claim 1, wherein the cable includes a second cable connector located opposite the cable from the first cable connector, and wherein the system further comprises:
   a second cable connection information display subsystem that is included on the cable adjacent the second cable connector, wherein the second cable connection information display subsystem includes:
a second display device; and
a second SPI slave system that is coupled to the second cable connector and the second display device, wherein the second SPI slave system is configured to:
receive second connection information that identifies at least a second computing device and a second port on the second computing device that is connected to the second cable connector; and
provide the second connection information for display on the second display device to identify the second computing device and the second port.

7. The system of claim 6, wherein the second SPI slave system is configured to receive the second connection information either via the second cable connector and from a second SPI master system in the second computing device, or via the cable from the first cable connection information display subsystem.

8. An Information Handling System (IHS), comprising:
a first chassis;
a first port included on the first chassis;
a first processing system that is included in the first chassis and that is coupled to the first port; and
a memory system that is included in the chassis, that is coupled to the processing system, and that includes instructions that, when executed by the processing system, cause the processing system to provide a Serial Peripheral Interface (SPI) master system;
a first cable connector connected to the first port;
a cable extending from the first cable connector; and
a first cable connection information display subsystem that is included on the cable adjacent the first cable connector, wherein the first cable connection information display subsystem includes:
a first display device; and
a first SPI slave system that is coupled to the first cable connector and the first display device, wherein the first SPI slave system is configured to:
receive, via the first cable connector and from the SPI master system, first connection information that identifies at least the first chassis and the first port; and
provide the first connection information for display on the first display device to identify the first chassis and the first port.

9. The IHS of claim 8, wherein the first connection information also identifies at least one of: a building in which the first chassis is located and a rack in which the first chassis is located, and wherein the first SPI slave system is configured to provide the first connection information for display on the first display device to identify the at least one of: the building in which the first chassis is located and the rack in which the first chassis is located.

10. The IHS of claim 8, wherein the first display device is a flexible display device that is wrapped around a portion of the cable.

11. The IHS of claim 8, wherein the first SPI slave system is configured to receive the first connection information from the SPI master system via at least one of a Master Out/Slave In (MOSI) coupling, a Serial Clock (SCLK) coupling, or an Slave Select/Chip Select (SS/CS) coupling provided by the first cable connector.

12. The IHS of claim 8, wherein the cable is a Direct Attach Copper (DAC) cable, and wherein the first cable connector is a DAC cable connector.

13. The IHS of claim 8, wherein the cable includes a second cable connector located opposite the cable from the first cable connector, and wherein the IHS further comprises:
a second cable connection information display subsystem that is included on the cable adjacent the second cable connector, wherein the second cable connection information display subsystem includes: a second display device; and a second SPI slave system that is coupled to the second cable connector and the second display device, wherein the second SPI slave system is configured to: receive second connection information that identifies at least a chassis and a second port on the second chassis that is connected to the second cable connector; and provide the second connection information for display on the second display device to identify the second chassis and the second port.

14. A method for displaying cable connection information, comprising:
connecting, by a first cable connector that is included on a cable, to a first port on a first computing device;
receiving, by a first Serial Peripheral Interface (SPI) slave system in a first cable connection information display subsystem that is included on the cable adjacent the first cable connector and via the first cable connector from a first SPI master system in the first computing device, first connection information that identifies at least the first computing device and the first port; and
providing, by the first SPI slave system for display on a first display device that is included in the first cable connection information display subsystem, the first connection information to identify the first computing device and the first port.

15. The method of claim 14, wherein the first connection information also identifies at least one of: a building in which the first computing device is located and a rack in which the first computing device is located, and wherein the first SPI slave system provides the first connection information for display on the first display device to identify the at least one of: the building in which the first computing device is located and the rack in which the first computing device is located.

16. The method of claim 14, wherein the first display device is a flexible display device that is wrapped around a portion of the cable.

17. The method of claim 14, wherein the first SPI slave system receives the first connection information from the SPI master system in the first computing device via at least one of a Master Out/Slave In (MOSI) coupling, a Serial Clock (SCLK) coupling, or an Slave Select/Chip Select (SS/CS) coupling provided by the first cable connector.

18. The method of claim 14, wherein the cable is a Direct Attach Copper (DAC) cable, and wherein the first cable connector is a DAC cable connector.

19. The method of claim 14, further comprising:
connecting, by a second cable connector that is included on the cable opposite the first cable connector, to a second port on a second computing device;
receiving, by a second SPI slave system in a second cable connection information display subsystem that is included on the cable adjacent the second cable connector, second connection information that identifies at least the second computing device and the second port; and
providing, by the second SPI slave system for display on a second display device that is included in the second cable connection information display subsystem, the second connection information to identify the second computing device and the second port.

20. The method of claim 19, wherein the second SPI slave system receives the second connection information either via the second cable connector and from a second SPI master system in the second computing device, or via the cable from the first cable connection information display subsystem.

\* \* \* \* \*

UNITED STATES PATENT AND TRADEMARK OFFICE
CERTIFICATE OF CORRECTION

PATENT NO. : 11,494,156 B1
APPLICATION NO. : 17/382913
DATED : November 8, 2022
INVENTOR(S) : Shah et al.

Page 1 of 1

It is certified that error appears in the above-identified patent and that said Letters Patent is hereby corrected as shown below:

In the Claims

Claim 1, Column 14, Line 27, "a first Serial Peripheral Interface (SPI) system" should be changed to --a first Serial Peripheral Interface (SPI) slave system--

Signed and Sealed this
Seventh Day of February, 2023

Katherine Kelly Vidal
*Director of the United States Patent and Trademark Office*